July 10, 1962 H. M. McKAY 3,043,605
TRUCK TRAILER WITH SHIFTABLE RUNNING GEAR FOR LOAD EQUALIZING
Filed May 25, 1961 5 Sheets-Sheet 1
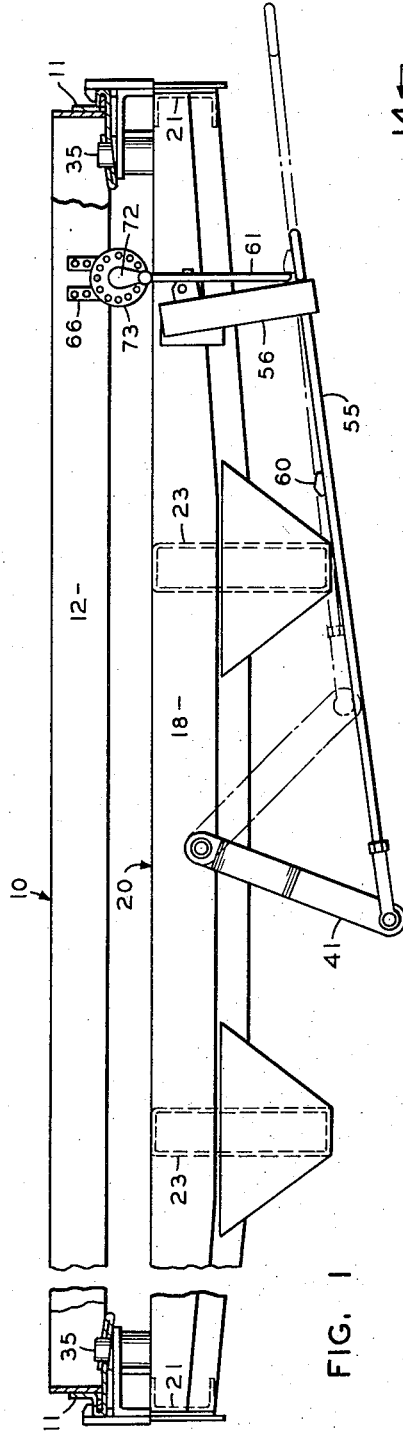
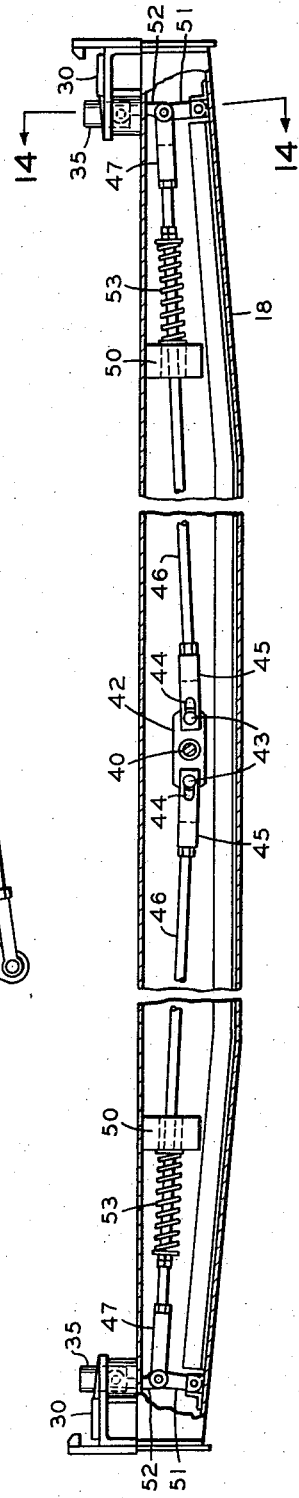
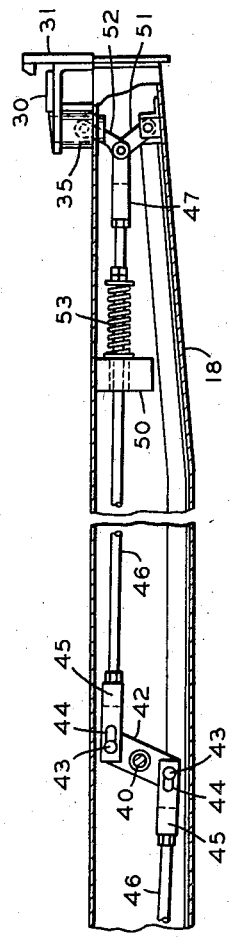
INVENTOR
HARRY M. McKAY
BY *Cohn and Powell*
ATTORNEYS July 10, 1962  H. M. McKAY  3,043,605
TRUCK TRAILER WITH SHIFTABLE RUNNING GEAR FOR LOAD EQUALIZING
Filed May 25, 1961  5 Sheets-Sheet 2
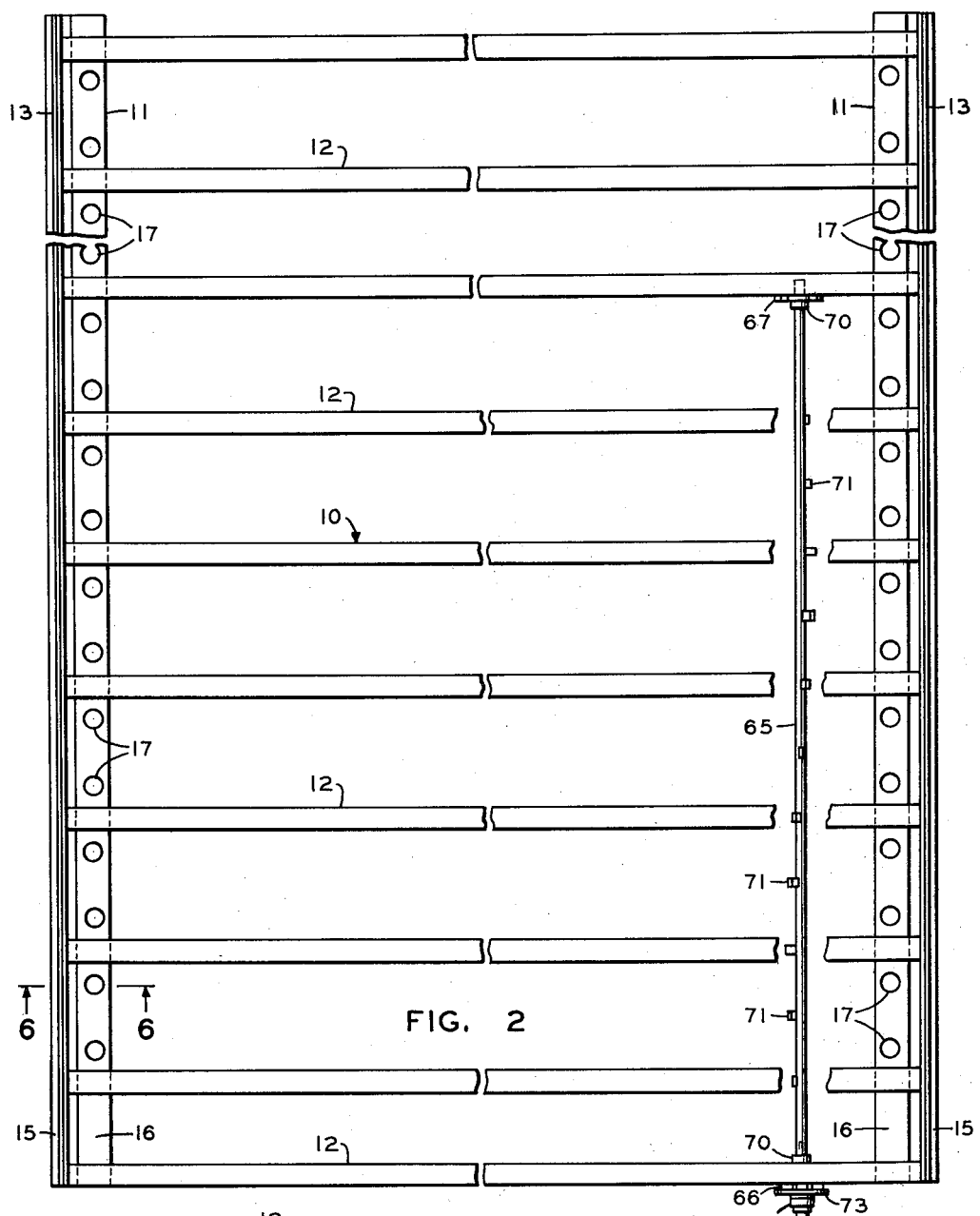
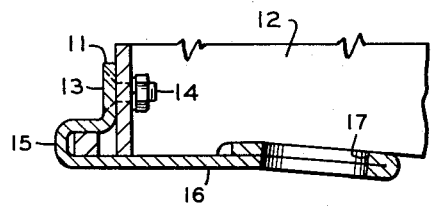
INVENTOR
HARRY M. McKAY
BY Cohn and Powell
ATTORNEYS INVENTOR
HARRY M. McKAY
BY
Cohn and Powell
ATTORNEYS

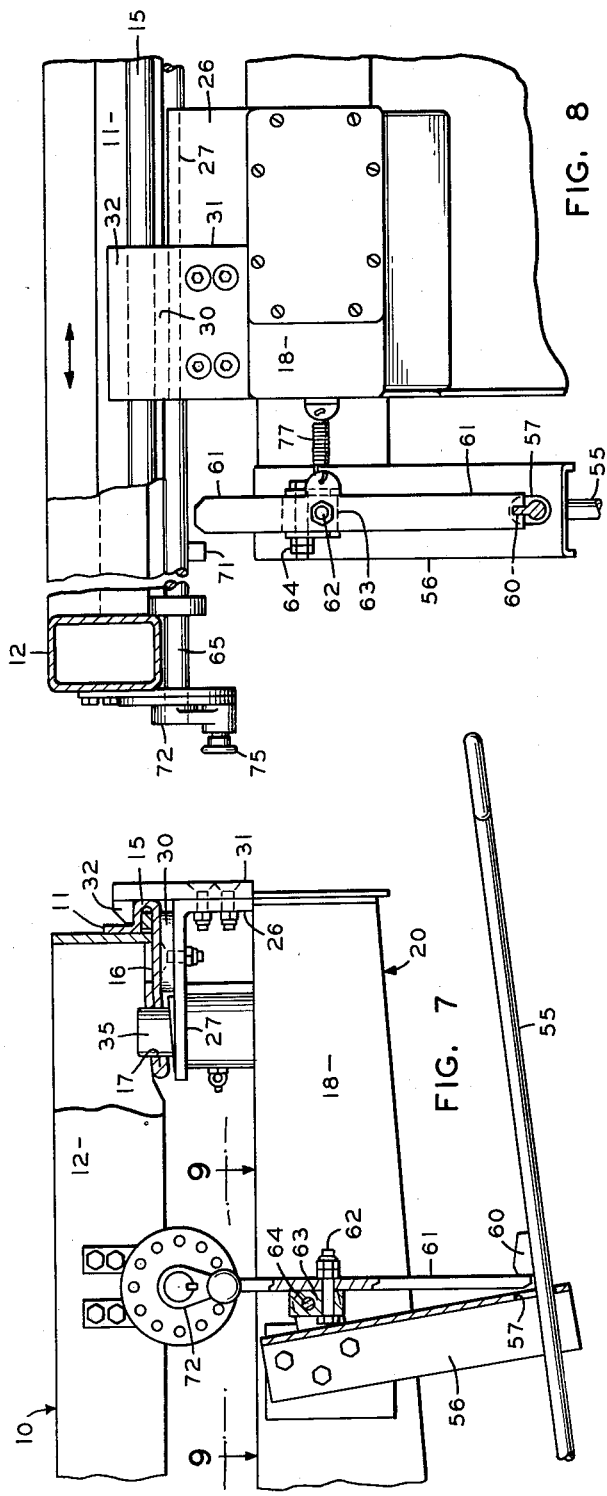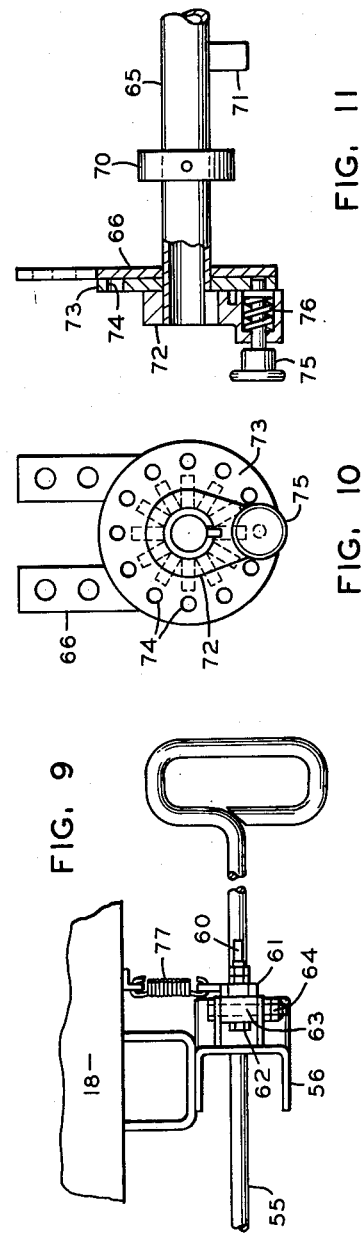

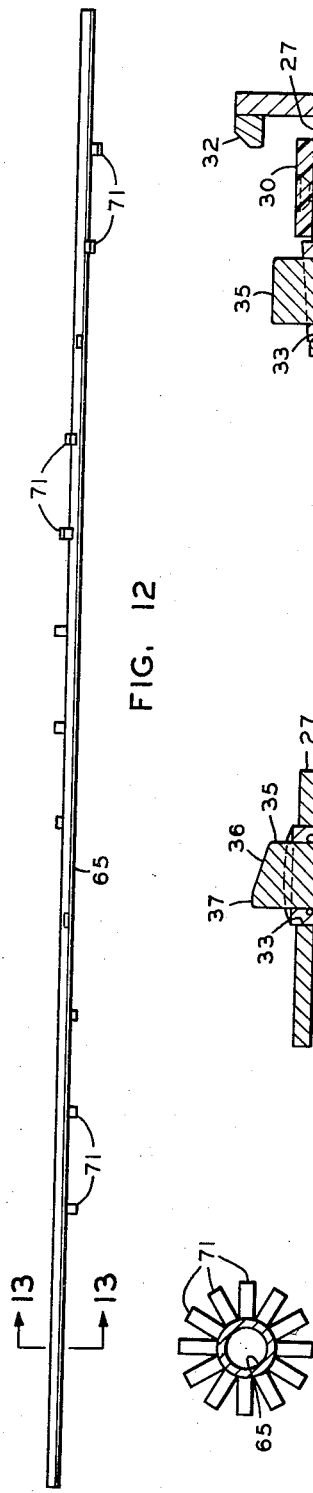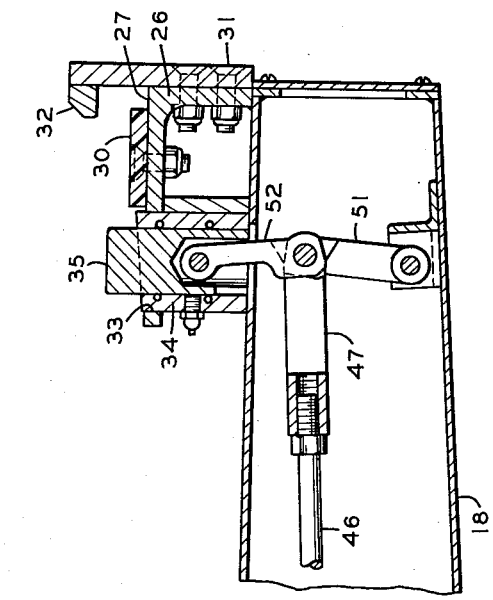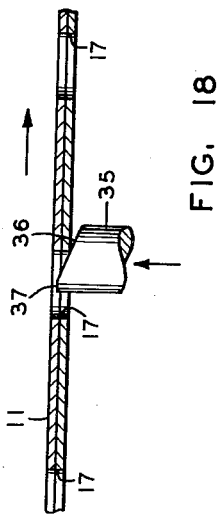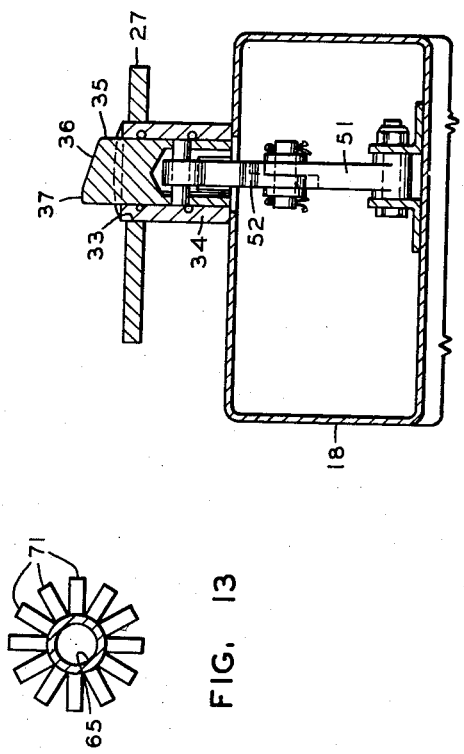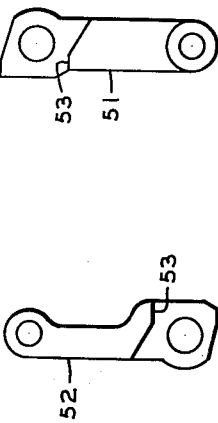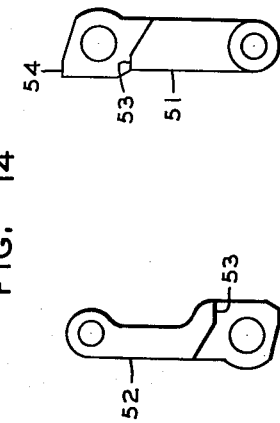

United States Patent Office 3,043,605
Patented July 10, 1962

3,043,605
TRUCK TRAILER WITH SHIFTABLE RUNNING GEAR FOR LOAD EQUALIZING
Harry M. McKay, Warrenton, Mo., assignor to The Binkley Company, Warrenton, Mo., a corporation of Missouri
Filed May 25, 1961, Ser. No. 112,574
16 Claims. (Cl. 280—81)

This invention relates generally to improvements in a truck trailer with shiftable running gear for load equalizing, and more particularly to an improved mechanism for adjusting the position of the rear wheels of a trailer in order to equalize the load on the wheels.

An important object is to provide a locking means that enables the wheel truck to be locked selectively to the trailer body in different adjusted positions. Other advantages are realized in providing means for releasing the lock and for automatically reengaging the same when the wheel truck and body have been moved to a predetermined relative position.

Another important objective is achieved by the provision of improved means for determining the relative position of the wheel truck and trailer body at which they are automatically locked. This preselector lock means is constructed so that it can be quickly and easily adjusted and set by anyone with only a minimum of instruction.

Still another important object is afforded by rotatively mounting a rod of the preselector lock means on the body frame so that any one of a plurality of radially extending lugs on the rod can be selectively located in a predetermined position in order to engage a pivoted latch upon relative movement of the wheel truck and body frame in either direction of movement, whereby to release a manipulating means at a predetermined position of the truck relative to the frame, the manipulating means acting automatically upon release to urge locking pins on the truck into cooperating sockets provided in the body frame for positive interconnection.

Yet anther important object is realized by the mounting and structural arrangement of the latch for the manipulating means which enables the latch to move pivotally in one plane upon engagement with the manipulating means so as to effect latching of such manipulating means whereby to hold the locking pins selectively out of the body frame sockets, and which enables the latch to move pivotally in another plane upon engagement with a preselected lug to cause release of the manipulating means for the purpose mentioned previously.

Another important object is achieved by the structural interconnection and support of the body frame on the wheel truck which enables the trailer body to be readily detached from and simply lifted off of the wheel truck for placement on another type of transport carrier such as a railway flat car.

Another important objective is realized by the structure and interconnection of the wheel truck and body frame which enables the bottom of the body frame to be constructed substantially flat so that the trailer body will have a firm base to support the trailer body when placed on a transport carrier such as a railway flat car. The provision of locking pins on the wheel truck which are reciprocatively mounted for vertical movement into and out of engagement with sockets provided in a horizontal plate portion of the body frame contribute to the attainment of the above stated advantages.

It is an important object to provide a load equalizer that is simple and durable in construction, economical to manufacture, efficient in operation, and which is substantially automatic.

The foregoing and numerous other objects and advantages of the invention will more clearly appear from the following detailed description of a preferred embodiment, particularly when considered in connection with the accompanying drawings, in which:

FIG. 1 is a front end elevational view of the wheel truck and body frame, the body frame being partially broken away to show the locking connection;

FIG. 2 is a top plan view of the trailer body frame;

FIG. 4 is a cross sectional view of the wheel truck as seen along line 4—4 of FIG. 3, the locking pins being shown in extended locking position;

FIG. 5 is a fragmentary cross sectional view similar to FIG. 4, but showing the locking pins retracted out of locking position;

FIG. 6 is an enlarged cross sectional view of one side rail of the body frame shown in FIG. 1;

FIG. 7 is an enlarged, fragmentary, end elevational view of the right hand side of the unit disclosed in FIG. 1, but showing the mounting of the latch partially in cross section for clarity;

FIG. 8 is a fragmentary side elevational view, partly in cross section as seen from the right of FIG. 7;

FIG. 9 is a fragmentary top plan view of the manipulating means as seen along line 9—9 of FIG. 7;

FIG. 10 is an enlarged end elevational view of the crank for the preselector mechanism shown in FIG. 7;

FIG. 11 is a side elevational view, partly in cross section of the preselector mechanism shown in FIG. 10;

FIG. 12 is a side elevational view of the preselector rod;

FIG. 13 is an enlarged cross sectional view of the rod as seen along line 13—13 of FIG. 12;

FIG. 14 is an enlarged cross sectional view of the locking pin as seen along line 14—14 of FIG. 4;

FIG. 15 is a cross sectional view of the locking pin as seen from the left of FIG. 14;

FIG. 16 is an enlarged side elevational view of the uppermost toggle arm shown in FIG. 15;

FIG. 17 is an enlarged side elevational view of the lowermost toggle arm shown in FIG. 15, and FIG. 18 is a cross sectional, fragmentary view illustrating the connection of a locking pin with its associated socket.

Figure 3:
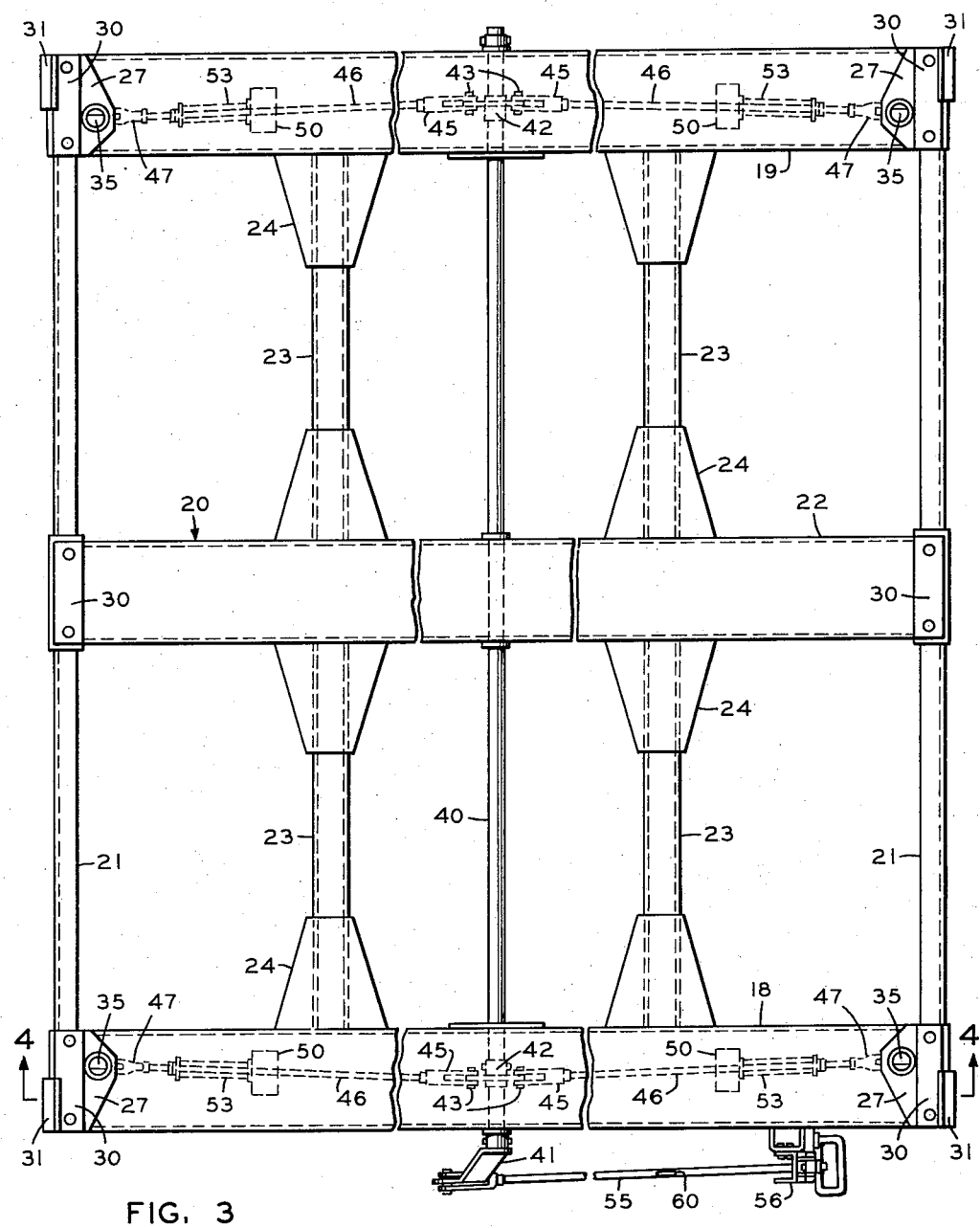
FIG. 3 is a top plan view of the wheel truck.

Referring now by characters of reference to the drawing, and first to FIG. 1, the body frame generally indicated at 10 is secured to the underside of the trailer body (not shown). The body frame 10 includes a pair of parallel spaced side rails 11 located at the bottom of the sides of the trailer body. These elongate side rails 11 are interconnected by a plurality of cross braces 12.

As is best seen in FIG. 6, each side rail 11 includes a vertical portion 13 attached by bolt 14 to the ends of cross braces 12, an outwardly extending reversed portion forming a horizontal lip 15 and an inwardly extending, substantially horizontal plate portion 16. Formed in the horizontal plate portion 16 of side rail 11 are a plurality of longitudinally spaced and aligned locking pin sockets 17.

It will be noted that this particular structural arrangement of the body frame provides a substantially flat base for the trailer body for its entire width, thereby enabling the trailer body to seat firmly on any flat supporting subjacent surface such as a railway flat car.

The wheel truck referred to at 20 includes a pair of parallel spaced side members 21 constructed usually of U-shaped channel forms and arranged so that their open sides face each other. These side members 21 are rigidly interconnected by three cross braces 18, 19 and 22 usually constructed of a box section. One of these cross braces 18 and 19 is located at each end of the side members 21 while the third cross brace 22 is located intermediate of such ends.

Extending between each of the end cross braces 18 and 19 and the intermediate cross brace 22 are a pair of sills 23, the sills 23 being attached by gusset plates 24. The wheels 25 of the wheel truck 20 are located within and between the side members 21.

Secured to the top of each end of the front and rear cross braces 20 is a bolster member 26. Each bolster member 26 includes a substantially horizontal plate portion 27 extending inwardly and located immediately below the side rails 11 of the body frame 10. Attached to the horizontal plate portion 27 is a bearing slide block 30 adapted to support the horizontal plate portion 16 of the associated side rail 11.

A hold-down plate 31 is detachably secured to the side of each bolster member 26, the hold-down plate 31 including a hook formation 32 adapted to overlap the outwardly extending lip 15 on the associated side rail 11. The hold-down plates 31 act to retain the body frame 10 in operative connection with the wheel truck 20. The hold-down plates 31 engage the side rails 11 and prevent lateral shifting or displacement of the trailer body relative to the wheel truck 20, yet permit relative sliding movement of the body frame and wheel truck in a fore and aft direction. It is seen that if it is desired to remove the trailer body from the wheel truck 20, the hold-down plates 31 are simply detached and the trailer body including the body frame 10 can be lifted off of the wheel truck 20 and placed on another type of transport carrier such as a railway flat car or onto another wheel truck.

Each of the bolster members 26 includes a circular aperture 33 adapted to receive and position a cylindrical tubular sleeve 34 constituting a guide means for a reciprocatively mounted locking pin 35. The sleeve 34 is secured to its associated bolster member 26 and to the top of the associated cross brace 18 or 19 as is best seen in FIG. 15. The locking pins 35 are mounted for vertical reciprocation and located so as to be received in any one of the cooperating sockets 17 provided in overlying associated side rail 11.

To avoid the possibility of overshooting the positions of the pins 35, each pin 35 is formed at the end engaging the socket with a bevelled face 36 which, as is shown in FIG. 18, is positioned at an angle with a plane normal to the axis of the pin. Preferably a small area of the end of the pin is left perpendicular to the axis as indicated at 37 in FIG. 18 so as to provide a bearing surface when engaging the underside of the side rail 11.

This shape of pin 35 facilitates the entrance of pin into its socket. When the side rail 11 is moving in the direction indicated by the arrow in FIG. 18 relatively to the truck frame, the side rail 11 will slide along the end of the pin 35 until the next socket 17 comes opposite such pin, at which point the end portion 37 of the pin will easily enter the socket since its cross section is reduced with respect to that of the body of the pin. Accordingly, the pin may start to enter the socket 17 before the socket is finally in alignment with the pin, and if the motion is relatively fast, it will be stopped by the pin and prevented from overshooting. The reduced tips 37 of the locking pins 35 are faced in opposite direction at the two ends of the truck frame so that the pins at one end will prevent overshooting in one direction, while those at the other end will perform the same duty when the movement is in the opposite direction.

The wheel truck has mounted thereon at each end thereof on the cross braces 18 and 19, a locking mechanism as is illustrated in FIGS. 3 and 4. As these mechanisms are identical at the two ends of the wheel truck, only one of them need be described. A shaft 40 extends longitudinally of the wheel truck 20 and is journalled at its ends in the front and rear cross braces 18 and 19. Secured to one end of shaft 40 is a lever 41 located in front of the cross brace 18.

Located within the cross brace 18 and secured to shaft 40 is a double bell crank 42. The crank 42 carries two crank pins 43 equally spaced on opposite sides of the axis of shaft 40. Connected to each pin 43 by means of a slot 44 in which the pin 43 is movable, is a yoke 45. A lock rod 46 is attached to each yoke 45 and is attached at the opposite end to a similar yoke 47, the rod being slidably supported intermediately by a bracket 50. The yoke 47 is pivotally connected to a pair of toggle arms 51 and 52, one of the arms being pivotally supported to the cross brace 22 while the other arm 52 is pivotally connected to a locking pin 35. The toggle arms 51 and 52 are arranged so that when folded by the lock rod 46, the locking pin 35 is retracted out of its cooperating socket 17, and conversely, when the toggle arms 51 and 52 are extended, the locking pin 35 is vertically raised into its socket 17.

The detailed structure of the toggle arms 51 and 52 is best shown in FIGS. 16 and 17. These toggle arms 51 and 52 are provided with stop abutments 53 that interengage with coacting stop shoulders 54 to retain the toggle arms 51 and 52 in an extended over-center position shown in FIG. 15. Any vertical load exerted on locking pin 35 and transmitted to the toggle arms 51 and 52 will not cause any collapse of the toggle arms, and thereby will not cause any retraction unintentionally of the locking pin 35. To retract the locking pin 35, the toggle arms 51 and 52 must be positively broken or pulled back from the over-center position, and then folded under the pulling action of lock rod 46.

A compression spring 53 is located about each of the lock rods 46, one end of spring 53 engaging an abutment on the rod 46 while the other end engages the bracket 50. The springs 54 constitute resilient means tending to urge the lock rods 46 in a direction so as to extend the toggle arms 51 and 52, and hence extend the locking pins 35 into locking engagement with their associated sockets 17 formed in side rails 11.

The slots 44 provide a lost motion between the yokes 45 and pins 43 so that in case all of the locking pins 35 do not come into alignment with their sockets 17 simultaneously, each one may enter its own socket individually when that socket does come into alignment. As there are four locking pins 35, a four-fold lock is provided.

Pivotally attached to the other end of lever 41 is a lock handle 35 constituting a manipulating means, the handle 55 extending laterally outward to one side of the wheel truck 20. As is best seen in FIGS. 7 and 8, a bracket 56 is fixed to the front wall of the forwardmost cross brace 18. The bracket 56 includes a slot 57 constituting a guide means adapted to receive the trip handle 55. The trip handle 55 is constrained by bracket 56 to slidable operation in a vertical plane at a right angle to the direction of relative movement of body frame 10 and wheel truck 20. A catch abutment 60 is formed on the trip handle 55, the catch abutment 60 being adapted to slide through the bracket slot 57 upon actuation of the handle 55 incident to locking and unlocking the pins 35.

The control means for determining the relative position at which body frame 10 and wheel truck 20 are interlocked, includes a preselector latch 61. The latch 61 is pivoted by pin 62 to a block 63, such block 63 being pivoted in turn by pin 64 to the bracket 56. It will be noted that the pins 62 and 64 are right angularly related so that the latch 61 can pivot independently in either of two directions as will be later explained. The lower end of latch 61 extends downwardly and is normally located in overlapping relation to the bracket slot 57. Because there is a greater length between pivot pin 60 and the lower latch end than between the pivot pin 64 and the upper latch end, the latch 61 will normally assume the vertical position shown in FIG. 7.

When the handle 55 is pulled outwardly by the operator incident to detaching the locking pins 35, the catch abutment 60 engages the latch 61 and swings the latch 61 counterclockwise as viewed in FIG. 7 about the pivot pin 64 until the latch arm 61 rides over the catch abutment 60 and then drops under gravity back to the vertical position of FIG. 7 in front of the bracket slot 57 and in back of the catch abutment 60. In this position, the catch abutment 60 engages the latch 61 and the handle 55 is thereby held in this pin-unlocked position.

A preselector rod 65 is carried by the body frame 10 and more particularly extends longitudinally in the direction of movement of the body frame across the braces 12. The front end of rod 65 is rotatively mounted in a plate 66 that is attached to the forwardmost cross brace 18. The rear end of rod 65 is rotatively mounted to a similar plate 67 (FIG. 2) attached to one of the intermediate cross braces 12. Secured to rod 65 are a pair of collars 70 adapted to engage the rear faces of the cross braces 12 to which the plates 66 and 67 are attached, the collars 70 preventing longitudinal movement of rod 65.

A plurality of radially extending lugs 71 are attached to rod 65. These lugs 71 are spaced longitudinally along rod 65 and are arranged in angular relation. As is best seen in FIG. 10, in the embodiment disclosed, there are a total of 12 lugs arranged in 30 degrees relation.

The rod 65 is located directly above the latch arm 61 so that any one of the lugs 71 can be brought into the vertical plane of latch arm 61 and more particularly into the path of travel of the upper end of such latch arm 61. Attached to the front end of rod 65 is a crank 72 that the operator can manipulate to rotate the rod 65 in order to place a preselected lug 71 in the path of travel of the latch arm 61. Sandwiched between the crank 72 and the plate 66 is a circular selector plate 73. The selector plate 73 is fixedly attached to the mounting plate 66, while the crank 72 can be relatively rotated about the front face of such selector plate 73. Formed in pre-selector plate 73 are a plurality of apertures 74 arranged in regularly spaced relation to a circular row about the axis of rod 65. There are the same number of apertures 74 as there are lugs 71.

A plunger 75 is carried by the crank 72, and a spring 76 engages the plunger 75 and tends to urge the plunger 75 into any one of the apertures 74. Depending upon the aperture 74 into which the plunger 75 is located, an appropriate lug 71 is selected to be disposed in the path of travel of the upper end of latch 61.

When the body frame 10 is moved in either direction relative to the wheel truck 20, depending upon which side of the latch arm 61 the preselected lug 71 is located, the preselected lug 71 will engage the upper end of latch arm 61 and pivot such latch arm 61 about pivot pin 62, thereby moving the lower end of arm 61 out of operative engagement with the catch abutment 60 and releasing the lock handle 55 so that the resilient means tends to urge the locking pins 35 into engagement with the cooperating sockets 17 when the body frame 10 and wheel truck 20 are located relatively in a predetermined position. A spring 77 is attached to the latch arm 61 and tends to return the arm 61 to the initial vertical position shown in FIG. 8.

It is thought that the operation and functional advantages of the load equalizer have become fully apparent from the foregoing detailed description of parts, but for completeness of disclosure the locking and unlocking action of the locking pin will be briefly described. It will be assumed that the locking pins interengage sockets 17 and that the body frame 10 is thereby attached to the wheel truck 20, and that it is desired to change the relative position of the body frame relative to the wheel truck in order to equalize the load of the trailer on the wheels.

First, the operator withdraws plunger 75 from selector plate aperture 74 and rotates the rod 65 until the appropriate lug 71 is located vertically in the path of travel of latch arm 61. The plunger 75 is released and the plunger is automatically urged into the appropriate selector plate aperture 74 to retain the preselected lug 71 in this position.

Then, the operator grips the lock handle 55 and pulls it outwardly from the position shown in full lines in FIG. 1 to the position shown in broken lines. This action of the handle 55 swings the lever 41 and rotates the double bell cranks 42 from the position shown in FIG. 4 to the position shown in FIG. 5. As the double bell cranks are rotated, the lock rods 46 fold the toggle arms 51 and 52 to retract the locking pins 35 out of the sockets 17.

In addition, as the lock handle 55 is pulled outwardly, the catch abutment 60 engages the latch arm 61 and operates to swing the arm 61 counterclockwise about pivot pin 64. The lower end of latch arm 61 rides over the catch abutment 60 and drops into the position in front of guide slot 57 and in back of the catch abutment 60. When the lock handle 55 is released, the catch abutment 60 engages the latch arm 61, and the handle 55 is thereby retained.

A simple movement of the trailer body by means of the tractor in the required direction will cause the preselected lug 71 to trip the latch arm 61. More particularly, the preselected lug 71 engages the upper end of latch arm 61 and swings the arm about pivot pin 62 until the lower end of arm 61 clears the catch abutment 60. Immediately, the handle 55 is released, and the springs 54 operate to move the rods 46 in a direction to expand the toggle arms 51 and 52. Upon such expansion of toggle arms 51 and 52, the locking pins 35 are moved vertically into the appropriate sockets 17 in the side rails 11 of the body frame 10. Moreover, the springs 54 act to rotate the double bell crank 42 from the position shown in FIG. 5 to the position shown in FIG. 4, and consequently act through lever 41 to move the handle 55 inwardly to the position shown in full lines in FIG. 1. The body frame 10 and the wheel truck 20 are now securely locked and the body is ready for travel.

As soon as the preselected lug 71 clears the upper end of latch arm 61, the spring 77 tends to return the latch arm 61 to its vertical position so that its lower end overlaps the guide slot 57. The lock mechanism and manipulating device is now reconditioned for subsequent use as explained above.

Although the invention has been described by making detailed reference to a single preferred embodiment, such detail is to be understood in an instructive, rather than in any restrictive sense, many variants being possible within the scope of the claims hereunto appended.

I claim as my invention:

1. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on and disposed lengthwise of said body frame, a plurality of radially extending lugs spaced longitudinally along and about said rod, a latch for said manipulating means, and means connected to said rod for turning the rod to place a preselected lug in the path of travel of said latch, the preselected lug engaging the latch upon relative movement of the truck and frame in either direction of movement to release said manipulating means at a predetermined position of said truck relative to said frame.

2. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on said body frame, a plurality of radially extending lugs spaced longitudinaly along and about said rod, a latch for said manipulating means, means on the truck constraining the manipulating means into and out of latched position, means connected to said rod for turning the rod to place a preselected lug in the path of travel of said latch, means pivotally mounting said latch to enable swinging movement upon engagement with the selected lug to unlatch the manipulating means, the preselected lug engaging the latch upon relative movement of the truck and frame in either direction of movement to release said manipulating means at a predetermined position of said truck relative to said frame, and means pivotally mounting said latch to enable swinging movement upon engagement with said manipulating means as the manipulating means is moved to latched position.

3. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on and disposed lengthwise of said body frame, a plurality of radially extending lugs spaced longitudinally along said rod and disposed in angular relation, a latch selectively engageable with said manipulating means to hold the pin retracted, means connected to said rod for turning the rod to place a preselected lug in the path of travel of said latch, means pivotally mounting the latch to enable swinging movement in one plane upon engagement with the preselected lug to unlatch the manipulating means and pivotally mounting the latch to enable the swinging movement in another plane upon engagement with said manipulating means as the manipulating means is moved to the latched position, the preselected lug engaging the latch upon relative movement of the truck and frame in either direction of movement at a predetermined position of said truck relative to said frame.

4. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on said body frame, a plurality of radially extending lugs spaced longitudinally along said rod and disposed in angular relation, means connected to said rod for turning the rod to place a preselected lug in a predetermined position, means on the truck constraining movement of the manipulating means to a plane substantially at right angles to the path of travel of said preselected lugs, said manipulating means including a catch abutment, a latch disposed in the path of said preselected lug and in the path of said catch abutment, and means pivotally connecting the latch to enable swinging movement in the plane of said preselected lug upon engagement with the preselected lug incident to relative movement of the truck and frame in either direction of movement whereby to release said manipulating means from said catch abutment at a predetermined position of said truck relative to said frame, and the last said means pivotally mounting the latch to enable swinging movement in the plane of said manipulating means upon engagement with the manipulating means so as to effect operative engagement of the latch with said catch abutment.

5. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on said body frame, a plurality of radially extending lugs spaced longitudinally along and about said rod, means connected to said rod turning the rod to place a preselected lug in a predetermined path of travel, means on the truck constraining movement of the manipulating means to a predetermined path of travel, said manipulating means including a catch abutment, a latch disposed in the path of preselected lug and in the path of said catch abutment, one end of said latch engaging the catch abutment to retain the manipulating means in a latched position, means pivotally mounting said latch to enable swinging movement upon engagement of the manipulating means with the one end of said latch as the manipulating means is moved to latched position, and means pivotally mounting said latch to enable swinging movement upon engagement of the other end of said latch with the preselected lug incident to relative movement of the truck and frame in either direction of movement so as to release said manipulating means at a predetermined position of said truck relative to said frame.

6. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted and disposed lengthwise of said body frame, a plurality of radially extending lugs spaced longitudinally along said rod and disposed in angular relation, means connected to said rod for turning the rod to place a preselected lug in a predetermined path of travel, means on the truck constraining movement of the manipulating means to a plane substantially at right angles to the path of travel of said preselected lug, said manipulating means including a catch abutment, a latch having one end disposed in the path of said preselected lug and the other end disposed in the path of said catch abutment, said other end of the latch engaging the catch abutment to hold the pin retracted, a block pivoted to said truck for movement parallel to the plane of movement of said manipulating means, and means pivotally mounting said latch to said block for movement of the latch in the plane of said preselected lug, the preselected lug engaging the one end of the latch upon relative movement of the truck and frame in either direction of movement so as to swing the latch in the plane of said preselected lug to release the other end of said latch from said catch abutment at a predetermined position of said truck relative to said frame, and the manipulating means engaging the said other end of the latch to enable swinging movement of the latch in the plane of movement of the manipulating means as the manipulating means is moved to the latched position in which the said other end of the latch engages the catch abutment.

7. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on and disposed lengthwise in the direction of movement of said body frame, a plurality of radially extending lugs spaced longitudinally along and about said rod, a plate attached to the truck about one end of said rod, said plate being provided with a plurality of apertures spaced peripherally about said rod axis, a preselector crank attached to the said one end of said rod adjacent said plate, means carried by said crank selectively movable into any one of said apertures to retain the rod and position a preselected lug in a predetermined path of travel, a latch for said manipulating means, the preselected lug engaging the latch upon relative movement of the truck and frame in either direction of movement to release said manipulating means at a predetermined position of said truck relative to said frame.

8. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted on and disposed lengthwise in the direction of movement of said body frame, a plurality of radially extending lugs spaced longitudinally along said rod and disposed in angular relation, a latch selectively engageable with said manipulating means to hold the pin retracted, means on the truck constraining the manipulating means to a plane of travel into and out of latched position, a plate attached to the truck about one end of said rod, said plate being provided with a plurality of apertures spaced peripherally about said rod axis, a preselector crank attached to the said one end of said rod adjacent said plate, means carried by said crank selectively movable into any one of said apertures to retain the rod and to position a preselected lug in the path of the latch, means pivotally mounting the latch to enable swinging movement in one plane upon engagement with the preselected lug incident to relative movement of the truck and frame in either direction of movement to release the manipulating means at a predetermined position of said truck relative to said frame, and means pivotally mounting the latch to enable swinging movement in another plane upon engagement with said manipulating means as the manipulating means is moved to the latched position.

9. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a rod rotatively mounted and disposed lengthwise in the direction of travel of said body frame, a plurality of radially extending lugs spaced longitudinally along said rod and disposed in angular relation, a plate attached to the truck about one end of said rod, said plate being provided with a plurality of apertures spaced peripherally about said rod axis, a crank attached to the said one end of said rod adjacent said plate, a plunger carried by the crank selectively movable into any one of said apertures to retain the rod and to position a preselected lug in a predetermined path of travel, means on the truck constraining movement of the manipulating means to a plane substantially at right angles to the path of travel of said preselected lug, said manipulating means including a catch abutment, a latch having one end disposed in the path of said preselected lug and the other end disposed in the path of said catch abutment, the said other end of the latch engaging the catch abutment to hold the pin retracted, means pivotally mounting said latch to enable swinging movement in the plane of said preselected lug upon engagement of said one end of latch with the preselected lug so as to disengage the other end of the latch from the catch abutment, means connected to said latch tending to return the pivoted latch to its latch position after release of the manipulating means, and means pivotally mounting said latch to enable swinging movement in the plane of said manipulating means upon engagement of the said other end of the latch with said manipulating means as the manipulating means is moved to latched position in which the said other end of the latch operatively engages the catch abutment.

10. In a trailer of the character described, a body frame including side rails adapted to be secured to the bottom of the trailer body at the sides thereof, said side rails being provided with locking pin sockets spaced therealong, a wheel truck movable along said body frame, said truck including bolster members underlying said side rails, a locking pin carried by said truck, resilient means urging said pin toward locking engagement with one of said sockets, manipulating means operable to retract said pin from such engagement, a rod rotatively mounted on said body frame, a plurality of radially extending lugs spaced longitudinally along and about said rod, the rod being rotatable to place a preselected lug in a predetermined path of travel, a latch for said manipulating means, the preselected lug engaging the latch upon relative movement of the truck and frame in either direction of movement to release said manipulating means at a predetermined position of said truck relative to said frame, a hold-down plate detachably secured to each bolster member and overlapping the associated side rail to connect and retain the body frame and truck in assembly, and wheels mounted on the truck and located within the lateral confines of the bolster members.

11. In a trailer of the character described, a body frame including side rails adapted to be secured to the bottom of the trailer body at the sides thereof, each side rail having an outwardly extending lip and an inwardly extending horizontal portion, said body frame being substantially horizontal and providing a flat base for the trailer body, the inwardly extending horizontal portions of the side members being provided with locking pin sockets spaced therealong, a wheel truck movable along said body frame, said truck including bolster members underlying said side rails, a locking pin carried by said truck, resilient means urging said pin toward locking engagement with one of said sockets, manipulating means operable to retract said pin from such engagement, a rod rotatively mounted on said body frame, a plurality of radially extending lugs spaced longitudinally along and about said rod, the rod being rotatable to place a preselected lug in a predetermined path of travel, a latch for said manipulating means, the preselected lug engaging the latch upon relative movement of the truck and frame in either direction of movement to release said manipulating means at a predetermined position of said truck relative to said frame, a hold-down plate detachably secured to each bolster member and overlapping the outwardly extending lip of the associated side rail so as to interconnect and retain the body frame and truck in assembly, and wheels mounted on the truck and located laterally within the side bolster members.

12. In a trailer of the character described, a body frame including side rails adapted to be secured to the bottom of the trailer body at the sides thereof, the side rails having substantially horizontal plate portions, said horizontal plate portions having locking pin sockets spaced therealong, a wheel truck movable along said body frame, said truck including bolster members underlying and supporting said side rails, locking pins mounted on said truck for vertical reciprocative movement into and out of said sockets, means urging said pins toward locking engagement with predetermined sockets, manipulating means operable to retract said pins from such engagement, a rod rotatively mounted on said body frame, a plurality of radially extending lugs spaced longitudinally along and about said rod, a latch for said manipulating means, the rod being rotatable to place a preselected lug in the path of travel of said latch, the preselected lug engaging the latch upon relative movement of the truck and frame in either direction of movement to release said manipulating means at a predetermined position of said truck relative to said frame, and means detachably connecting the side rails to said bolster members.

13. In a trailer of the character described, a body frame including side rails adapted to be secured to the bottom of the trailer body at the sides thereof, each side rail having an outwardly extending lip and an inwardly extending horizontal extending portion, said body frame being substantially horizontal and providing a flat base for the trailer body, the horizontal portion of the side rails being provided with locking pin sockets spaced therealong, a wheel truck movable along said body frame, said truck including bolster members supporting said side rails, bearing blocks between the side rails and said bolster members, a locking pin carried by each bolster member and mounted for vertical reciprocative movement into and out of said sockets, a hold-down plate detachably secured to each bolster member, said hold-down plate overlapping the outwardly extending lip of the associated side rail to interconnect and retain the body frame and truck in assembly, resilient means urging said pins toward locking engagement with said sockets, manipulating means operable to retract said pins from such engagement, a rod rotatively mounted on said body frame, a plurality of radially extending lugs spaced longitudinally along and about said rod, and a latch for said manipulating means, the rod being rotatable to place a predetermined lug in the path of travel of said latch, the preselected lug engaging the latch upon relative movement of the truck and frame in either direction of movement to release said manipulating means at a predetermined position of said truck relative to said frame.

14. In a trailer of the character described, a body frame including side rails adapted to be secured to the bottom of the trailer body at the sides thereof, the side rail having substantially horizontal plate portions, said horizontal plate portions being provided with locking pin sockets spaced therealong, a wheel truck movable along said body frame, said truck including bolster members underlying and supporting said side rails, a vertical tubular casing attached to each said bolster member, a locking pin mounted in each tubular casing for reciprocative movement into and out of said sockets, a pair of toggle arms attached to each pin, each pair of toggle arms being pivotally interconnected, one arm being pivotally attached to said truck and the other arm being pivotally attached to its associated locking pin, resilient means tending to expand said toggle arms and urge said pins toward locking engagement with said sockets, manipulating means operable to fold or expand said toggle arms so as to reciprocate said locking pins, means detachably connecting the side rails to said bolster members to retain the body frame and truck in assembly, a rod rotatively mounted on said body frame, a plurality of radially extending lugs spaced longitudinally along and about said rod, and a latch for said manipulating means to hold said pins retracted, the rod being rotatable to place a preselected lug in the path of travel of said latch, the preselected lug engaging the latch upon relative movement of the truck and frame in either direction of movement to release said manipulating means at a predetermined position of said truck relative to said frame.

15. The combination and arrangement of elements as recited above in claim 14, but further characterized in that each pair of toggle arms includes stop means that interengage to hold the arms in an over-center extended position upon vertical extension of pin associated with said pair of toggle arms into a socket, whereby to preclude unintentional retraction of said pin from the socket.

16. In a trailer of the character described, a body frame, a wheel truck movable along said frame, locking means selectively interconnecting said body frame and wheel truck in adjusted relative positions, manipulating means connected to said locking means and operable to lock or unlock said locking means, a rod rotatively mounted on and disposed lengthwise of said body frame, a plurality of radially extending lugs spaced longitudinally along and about said rod, a latch for said manipulating means to maintain said locking means unlocked, and means connected to said rod for turning the rod to place a preselected lug in the path of travel of said latch, the preselected lug engaging the latch upon relative movement of the truck and frame in either direction of movement to release said manipulating means at a predetermined position of said truck relative to said frame.

References Cited in the file of this patent

UNITED STATES PATENTS

| | | |
|---|---|---|
| 2,818,272 | De Lay | Dec. 31, 1957 |
| 2,831,700 | Sheppard et al. | Apr. 22, 1958 |
| 2,839,311 | Locker | June 17, 1958 |
| 2,888,297 | Ridgway | May 26, 1959 |
| 2,900,194 | De Lay | Aug. 18, 1959 |